United States Patent
Ito et al.

(10) Patent No.: US 12,242,713 B2
(45) Date of Patent: Mar. 4, 2025

(54) INFORMATION PROCESSING DEVICE, SETTING METHOD, AND SETTING PROGRAM FOR GRAPHICALLY DEFINING A FLOW OF A SERIES OF PROCESSES

(71) Applicant: NTT Communications Corporation, Tokyo (JP)

(72) Inventors: Koji Ito, Kawasaki (JP); Keisuke Kiritoshi, Tokyo (JP)

(73) Assignee: NTT COMMUNICATIONS CORPORATION, Tokyo (JP)

( * ) Notice: Subject to any disclaimer, the term of this patent is extended or adjusted under 35 U.S.C. 154(b) by 0 days.

(21) Appl. No.: 17/944,196

(22) Filed: Sep. 14, 2022

(65) Prior Publication Data

US 2023/0013943 A1    Jan. 19, 2023

Related U.S. Application Data

(63) Continuation of application No. PCT/JP2020/047572, filed on Dec. 18, 2020.

(30) Foreign Application Priority Data

Mar. 18, 2020  (JP) .................... 2020-048486

(51) Int. Cl.
  *G06F 3/00*   (2006.01)
  *G06F 3/0484*   (2022.01)
(52) U.S. Cl.
  CPC .................. *G06F 3/0484* (2013.01)
(58) Field of Classification Search
  CPC .................................................. G06F 3/0484
  See application file for complete search history.

(56) References Cited

U.S. PATENT DOCUMENTS

| | | | |
|---|---|---|---|
| 7,259,763 B2 * | 8/2007 | Jager | G06T 11/20 345/440 |
| 7,689,969 B1 * | 3/2010 | Wendling | G06F 21/14 713/193 |

(Continued)

FOREIGN PATENT DOCUMENTS

| | | |
|---|---|---|
| CN | 106021497 A | 10/2016 |
| CN | 108696657 A | 10/2018 |

(Continued)

OTHER PUBLICATIONS

"ReNom", Retrieved from Internet URL:gridpredict.jp/our_services/renom/, retrieved on Feb. 17, 2020, 2 pages.

(Continued)

*Primary Examiner* — Brett A Feeney
*Assistant Examiner* — Andrew Chung
(74) *Attorney, Agent, or Firm* — XSENSUS LLP

(57) ABSTRACT

An information processing device that displays, on a screen, cards associated with a series of respective processes performed on data and that defines a flow of the series of processes by connecting the cards by first lines, the information processing device includes processing circuitry configured to receive an operation performed by a user, perform, when an operation for connecting the cards by second lines that represent synchronization of parameters is received, a setting for allowing the parameters of the respective processes associated with the plurality of cards connected by the second lines to be synchronized, and make, when a parameter of one of the cards is changed out of the plurality of cards in which the setting for allowing the parameters to be synchronized has been performed, a same change on the parameters of the respective processes associated with the plurality of cards connected by the second lines.

11 Claims, 8 Drawing Sheets

(56) References Cited

U.S. PATENT DOCUMENTS

| | | | |
|---|---|---|---|
| 2002/0116666 A1* | 8/2002 | Perez | G01R 31/318371 |
| | | | 714/38.1 |
| 2002/0198971 A1* | 12/2002 | Resnick | G06F 9/454 |
| | | | 709/221 |
| 2013/0132875 A1* | 5/2013 | Allen | G06F 3/04842 |
| | | | 715/765 |
| 2014/0100668 A1 | 4/2014 | Jundt et al. | |
| 2015/0220311 A1 | 8/2015 | Salter | |
| 2017/0213126 A1 | 7/2017 | Hammond et al. | |
| 2018/0285041 A1 | 10/2018 | Yasui | |
| 2018/0293498 A1* | 10/2018 | Campos | H04L 67/01 |
| 2020/0336547 A1* | 10/2020 | Sabharwal | H04L 41/0836 |

FOREIGN PATENT DOCUMENTS

| | | |
|---|---|---|
| JP | 8-314702 A | 11/1996 |
| JP | 2016-504640 A | 2/2016 |
| JP | 2016-96393 A | 5/2016 |

OTHER PUBLICATIONS

"Neural Network Console", Retrieved from Internet URL:dl.sony.com/ja/, retrieved on Feb. 17, 2020, 9 pages.

Chinese Office Action issued Dec. 27, 2023, in corresponding Chinese Patent Application No. 202080098354.8, 14 pp.

\* cited by examiner

INFORMATION PROCESSING DEVICE, SETTING METHOD, AND SETTING PROGRAM FOR GRAPHICALLY DEFINING A FLOW OF A SERIES OF PROCESSES

CROSS-REFERENCE TO RELATED APPLICATIONS

This application is a continuation application of International Application No. PCT/JP2020/047572 filed on Dec. 18, 2020 which claims the benefit of priority of the prior Japanese Patent Application No. 2020-048486, filed on Mar. 18, 2020, the entire contents of each are incorporated herein by reference.

FIELD

The present invention relates to an information processing device, a setting method, and a setting program.

BACKGROUND

In recent years, a lot of tools, such as Neural Network Console and ReNom, that support development of a data analysis system using a Graphical User Interface (GUI) are proposed. As compared to a case in which a data analysis system is developed by using a programming language, such as Python, there is an expected effect in that, by using these tools, it is possible to easily grasp the entire of an analysis procedure, development time is reduced, a risk of an error mixed into a program is decreased, and trial and error is easily performed by adjusting parameters, so that these tools are expected to be increasingly used in the future.

Non-Patent Document 1: "ReNom", online, URL: gridpredict.jp/our_services/renom/, searched on Feb. 17, 2020

Non-Patent Document 2: "Neural Network Console", online, URL: dl.sony.com/ja/, searched on Feb. 17, 2020

However, in the related technology, there is a problem in that setting of the parameters takes a lot of time and efforts. For example, when development of a data analysis system is supported by using a GUI, the flow of a series of processes is generally designed by connecting cards that represent processes to be performed on data by using lines that represent the flow of data. Various parameters need to be set in order to process the data; however, setting the same parameter to the plurality of cards is a troublesome task. In particular, when trial and error is performed by changing the parameters, there is a need to again set the same parameter to the plurality of cards, so that it takes a lot of time and efforts to perform trial and error.

Furthermore, depending on a function, a parameter is sometimes calculated from data; however, in order to apply this parameter to another card, there is a need to make a note of or to store the parameter calculated from the data and again set the calculated parameter to the other card, which becomes a more complicated task.

SUMMARY OF THE INVENTION

It is an object of the present invention to at least partially solve the problems in the related technology.

According to an aspect of the embodiments, an information processing device that displays, on a screen, cards associated with a series of respective processes performed on data and that defines a flow of the series of processes by connecting the cards by first lines, the information processing device includes: processing circuitry configured to: receive an operation performed by a user; perform, when an operation for connecting the cards by second lines that represent synchronization of parameters is received by the input unit, a setting for allowing the parameters of the respective processes associated with the plurality of cards connected by the second lines to be synchronized; and make, when a parameter of one of the cards is changed out of the plurality of cards in which the setting for allowing the parameters to be synchronized has been performed by the setting unit, a same change on the parameters of the respective processes associated with the plurality of cards connected by the second lines.

The above and other objects, features, advantages and technical and industrial significance of this invention will be better understood by reading the following detailed description of presently preferred embodiments of the invention, when considered in connection with the accompanying drawings.

DESCRIPTION OF EMBODIMENTS

Preferred embodiments of an information processing device, a setting method, and a setting program disclosed in the present application will be explained in detail below with reference to the accompanying drawings. In addition, the information processing device, the setting method, and the setting program according to the present application are not limited by the embodiments.

First Embodiment

In the embodiment described below, a configuration of an information processing device 10 according to a first embodiment and the flow of the process performed in the information processing device 10 will be described in this order as described in this sentence and, lastly, advantageous effect of the first embodiment will be described.

Configuration of Information Processing Device

Figure 1:
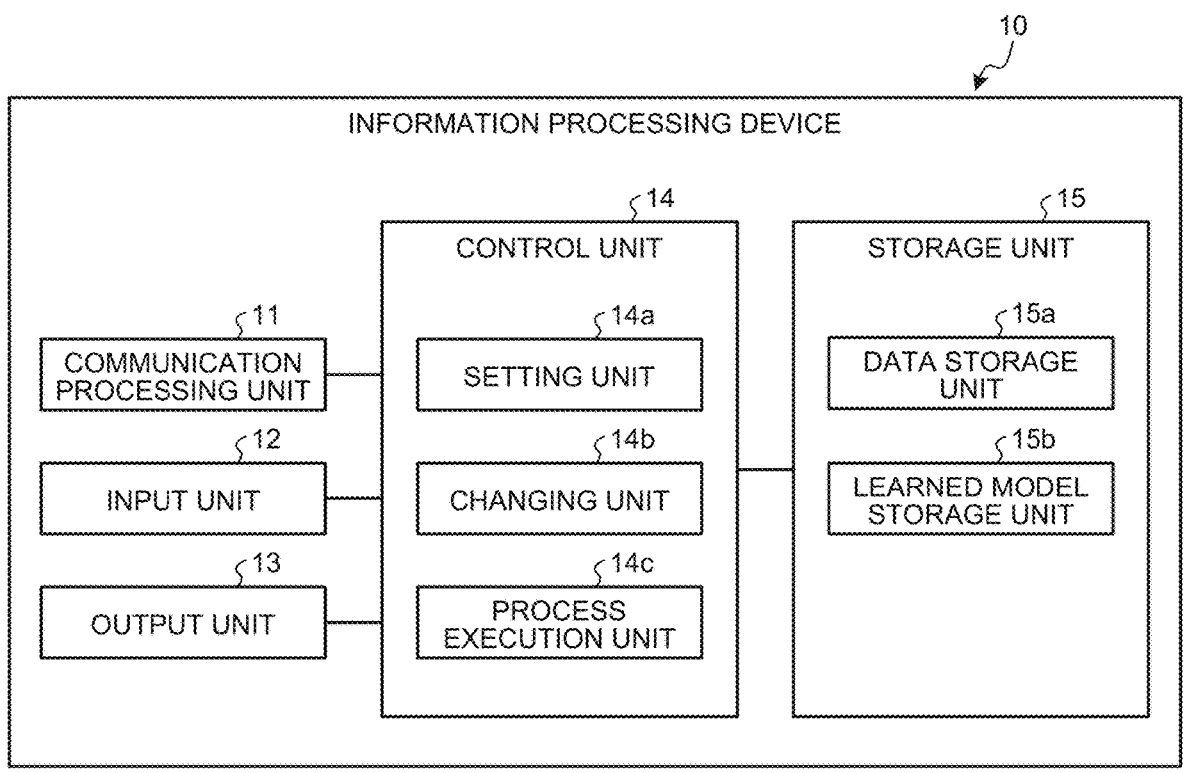
FIG. 1 is a block diagram illustrating a configuration example of an information processing device according to a first embodiment.

First, a configuration of the information processing device 10 will be described with reference to FIG. 1. FIG. 1 is a block diagram of a configuration example of the information processing device according to the first embodiment. In the information processing device 10, cards that are associated with a series of respective processes of data are displayed on a screen and the flow of the series of processes is defined by connecting the cards by lines (first lines). For example, in the information processing device 10, by using a tool that supports development of a data analysis system in a GUI, it is possible to design the flow of the series of processes by displaying the cards each of which represents a process to be performed on data, and connecting the displayed cards by the lines (the first lines) each of which represents the flow of the data. In the example described below, it is assumed that, when the information processing device 10 connects the cards each of which represents a process to be performed on data, the information processing device 10 is able to set, in addition to the lines (the first lines) each representing the flow of the data, set lines (second lines) each of which allows a parameter of a parent card and a parameter of a child card are to be synchronized. If the parameter of the parent card has been changed, the changed setting is reflected on the parameter of the child card. Furthermore, after that, the parameter of the child card is not able to be directly edited, and the changed setting is synchronized with the setting of the parent card. In addition, the parameter mentioned here means a parameter that is used as a hyperparameter when the process indicated by the card is performed.

As illustrated in FIG. 1, the information processing device 10 includes a communication processing unit 11, an input unit 12, an output unit 13, a control unit 14, and a storage unit 15. In the following, processes performed by each of the units included in the information processing device 10 will be described.

The communication processing unit 11 performs data communication with another device via a network. For example, the communication processing unit 11 is a network interface card (NIC). The input unit 12 receives an input of data from a user. The input unit 12 is, for example, an input device, such as a mouse or a keyboard, and receives an operation, such as an operation for connecting cards, performed by the user. The output unit 13 outputs data displayed on a screen or the like. The output unit 13 is, for example, a display device, such as a display, and displays, on the screen, cards associated with a series of respective processes to be performed on data or the like.

Furthermore, it is assumed there are two types of operations for connecting cards performed by the user, i.e., "a case in which the flow of a process is set" and "a case in which a setting of synchronization of a parameter is performed", and it is assumed that the user is able to select one of the operations to be performed. Hereinafter, the line (the second line) that is used to set synchronization of the parameter is referred to as a "synchronization line". In addition, in the drawings, it is assumed that a synchronization line is represented by an arrow using the dotted line and the line (the first line) representing the flow of a process (data) is represented by an arrow using a solid line.

Furthermore, the storage unit 15 stores therein data and programs that are needed for various processes performed by the control unit 14 and includes a data storage unit 15a and a learned model storage unit 15b. For example, the storage unit 15 is a storage device corresponding to, for example, a semiconductor memory device, such as a random access memory (RAM) or a flash memory.

The data storage unit 15a stores therein data that is a processing target for a process executed in a process execution unit 14c. Furthermore, any type of data may be stored as long as data is constituted of a plurality of real values. For example, the data to be stored may be data (for example, data on temperature, a pressure, a sound, a vibration, or the like) on a sensor installed in a target apparatus provided in a factory, a plant, a building, a data center, or the like, or may be image data.

The learned model storage unit 15b stores therein a learned model that has been learned by a learning process performed by the process execution unit 14c that will be described later. For example, the learned model storage unit 15b stores therein, as a learned model, a prediction model of a neural network that is used to detect abnormality of a monitoring target facility.

The control unit 14 includes an internal memory for storing therein requested data and programs prescribing various kinds of procedures, whereby various kinds of processes are executed. For example, the control unit 14 includes a setting unit 14a, a changing unit 14b, and the process execution unit 14c. Here, the control unit 14 is, for example, an electronic circuit, such as a central processing unit (CPU), a micro processing unit (MPU), or a graphical processing unit (GPU), or an integrated circuit, such as an application specific integrated circuit (ASIC) or a field programmable gate array (FPGA).

When an operation for connecting cards by using synchronization lines that represent synchronization of the parameters is received by the input unit 12, the setting unit 14a performs a setting for allowing the parameters of the respective processes associated with the plurality of cards that are connected by the synchronization lines to be synchronized. For example, when an operation for connecting cards by using synchronization lines is received by the input unit 12, the setting unit 14a determines that one of the cards is a parent card and the other of the cards is a child card whose parameter is changed in accordance with a change in the parameter of the parent card, and then, performs the setting for allowing the parameter of the parent card to be synchronized with the parameter of the child card.

Furthermore, for example, when an operation for connecting the cards by using the synchronization lines is received by the input unit 12, if both of the processes indicated by the respective cards are the same kind of processes, the setting unit 14a may perform the setting for allowing the parameters to be synchronized.

In other words, if the user has connected the cards by using the synchronization lines each having a synchronization function and then change the parameter of the parent card, the changing unit 14b that will be described later reflects the changed setting on the child card. In addition, if the child card further has a child card, the changing unit 14b recursively repeats the changing operation.

In addition, if an operation for connecting the cards having the parameters that are dependent on the data by using the synchronization line is received by the input unit 12, the setting unit 14a may perform a setting for allowing the parameters that are dependent on the data to be synchronized.

Figure 2:
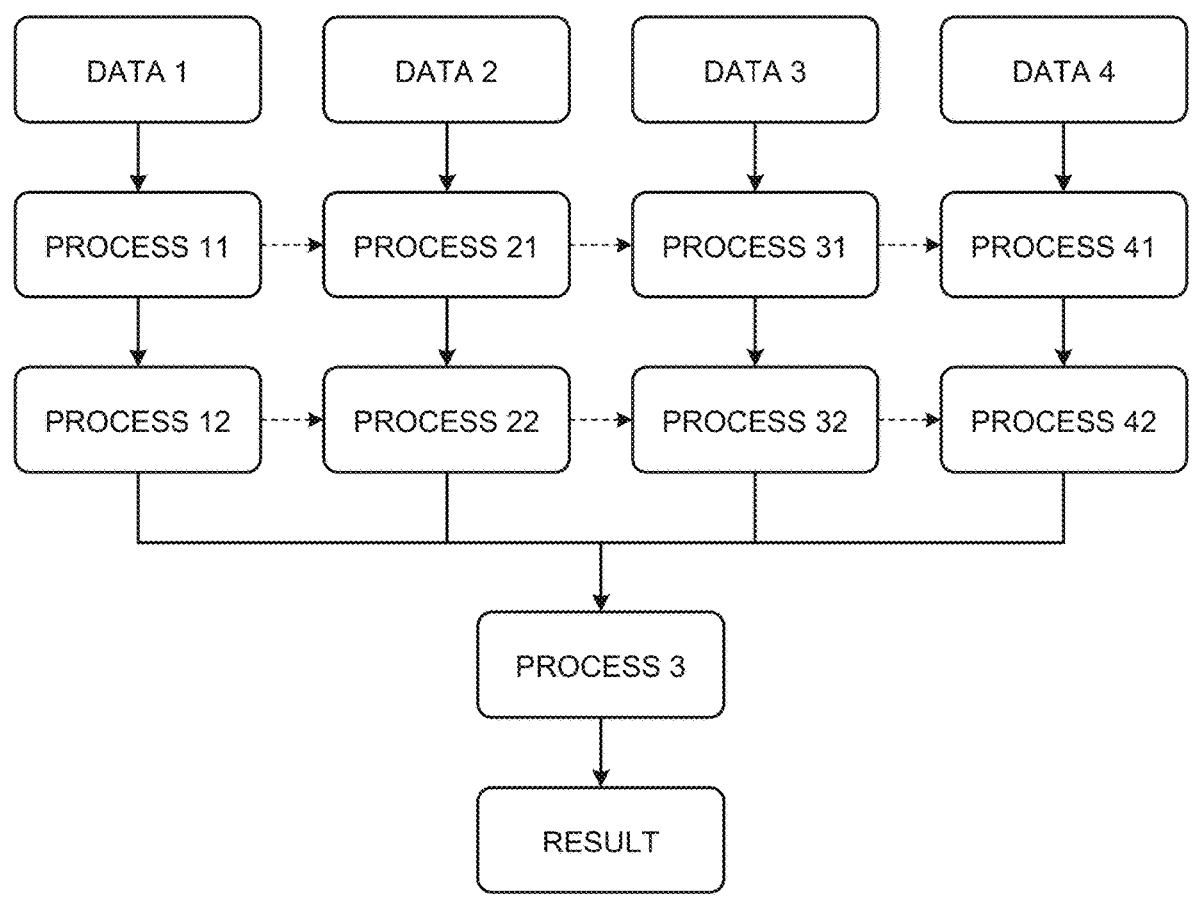
FIG. 2 is a diagram illustrating an image example in which cards that are needed to allow parameters to be synchronized are connected by synchronization lines.

In the following, an image example in which the cards that are needed to allow the parameters to be synchronized are connected by the synchronization lines will be described by using an example illustrated in FIG. 2. FIG. 2 is a diagram illustrating the image example in which the cards that are needed to allow the parameters to be synchronized are connected by the synchronization lines. In the example illustrated in FIG. 2, the cards connected by arrows indicated by the dotted lines are the cards in which the parameters have been synchronized. For example, as illustrated as an example in FIG. 2, a process 11, a process 21, a process 31, and a process 41 are connected by the arrows indicated by the dotted lines, the process 11 is set to be a parent card, whereas the process 21, the process 31, and the process 41 are set to be cards (child cards) whose setting are not able to be changed. In addition, if a set value is determined depending on the data, synchronization is similarly performed by a connection.

In addition, if a connection is constituted by a synchronization line having a synchronization function, after that, the information processing device 10 is not able to directly edit the parameter of the child card, and the setting of the child card is always synchronized with the setting of the parent card. As a result, in the information processing device 10, it is possible to collectively update the parameters of the cards that are recursively connected by only changing the parameter of the parent card, it is possible to reduce the time and effort needed to update the parameters.

Figure 3:
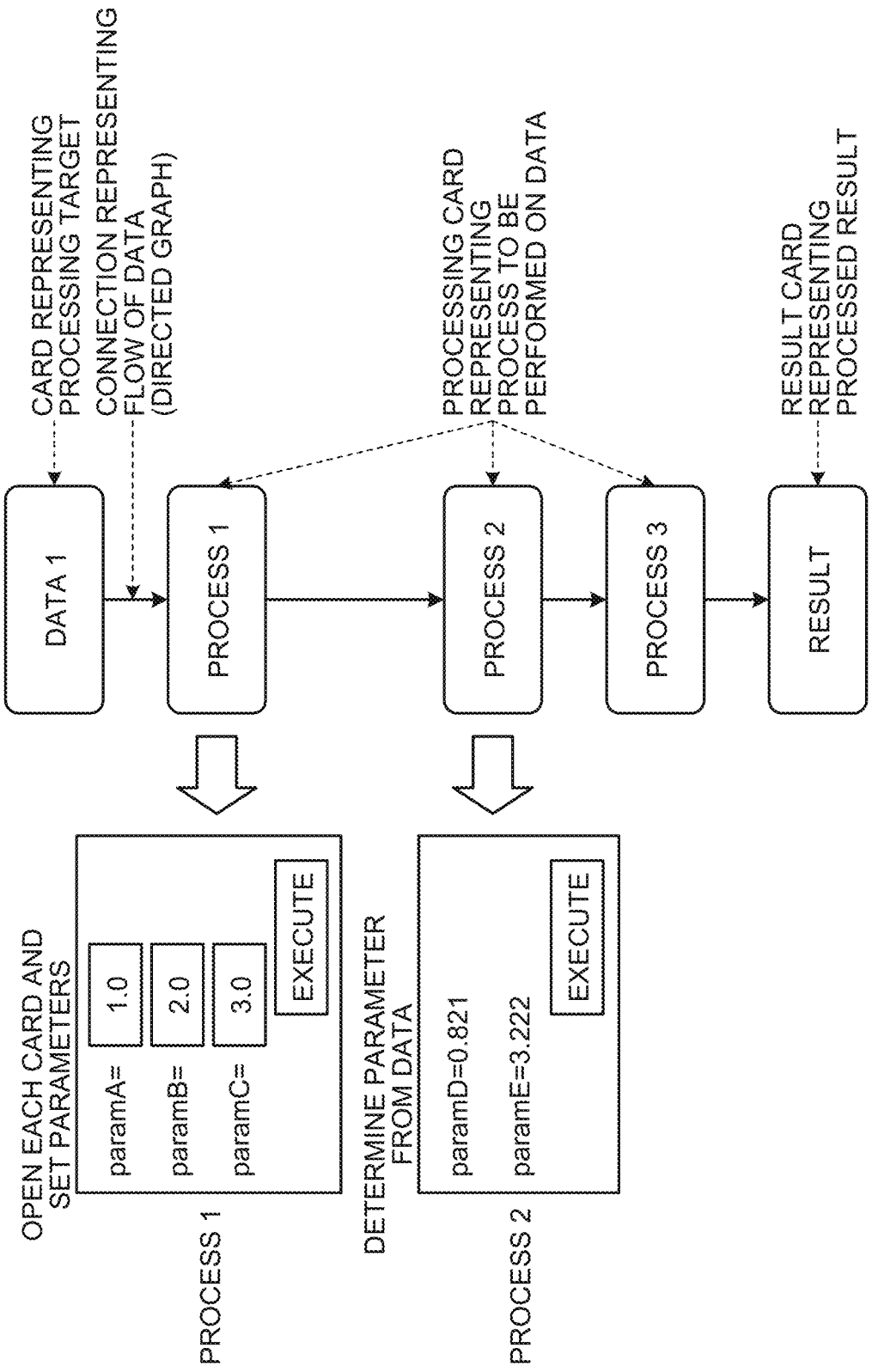
FIG. 3 is a diagram illustrating a setting of the parameters.

In the following, setting of the parameters will be described with reference to FIG. 3. FIG. 3 is a diagram illustrating the setting of the parameters. As illustrated as an example in FIG. 3, the card located at the top indicated by "data 1" is a card that represents process target data, the cards indicated by a "process 1", a "process 2", and a "process 3" are the processing cards each of which represents a process to be performed on data, the card located at the bottom indicated by "result" is a card that represents the processing result. In addition, as illustrated as an example in FIG. 3, the arrows that are indicated by the solid lines and that vertically connect the cards are connections that represent the flow of the data. In other words, the example illustrated in FIG. 3 indicates a series of processes for performing the process associated with the process 1 on the data that has been delivered from the data 1, performing the process 2 on the processing result obtained from the process 1, performing the process 3 on the processing result obtained from the process 2, and displaying the processing result obtained from the process 3.

The parameter of each of the processes has two types, that is, a parameter that is able to be manually set and a parameter that is determined depending on the data. For example, in the example illustrated in FIG. 3, parameters A to C related to the process 1 are able to be set by selecting the card indicated by the process 1. In addition, for example, in the example illustrated in FIG. 3, parameters D and E related to the process 2 are the parameters that are determined based on the data (for example, a result of arithmetic calculation during the process 2, etc.). Specifically, the parameter determined depending on the data is the parameter that is changed in accordance with a value of the average of the data or standard deviation out of the parameters in, for example, a normalization process.

Accordingly, in the information processing device 10, if the card that processes data has a parameter that is dependent on the data, the parameter generated in the parent card is recursively applied to a child card group by connecting the card and the other card by using the synchronization line that has the synchronization function, and time and efforts needed to set the parameters is reduced. In other words, in the information processing device 10, in addition to the parameter that is able to be manually set, it is possible to reduce the time and efforts needed to set the parameters that are depended on the data.

Figure 4:
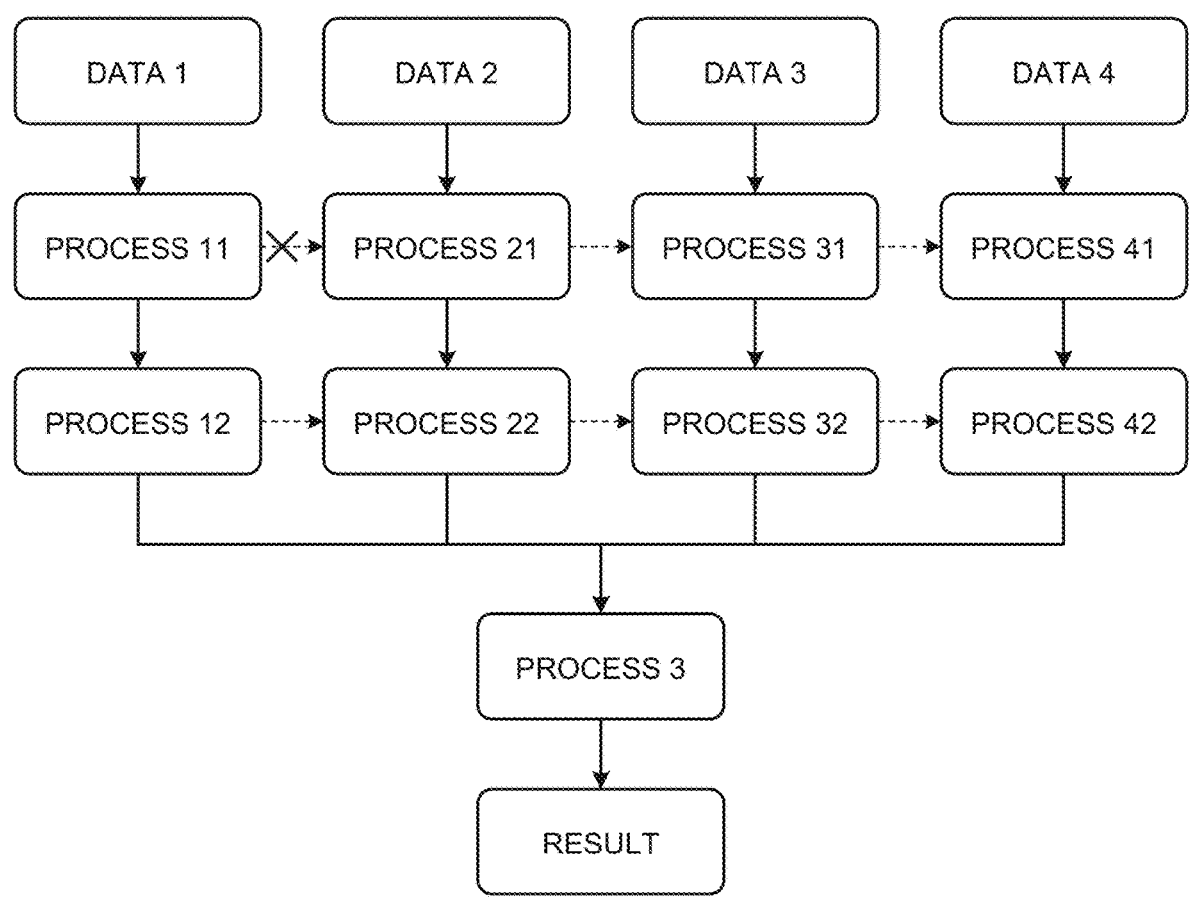
FIG. 4 is a diagram illustrating a process for releasing the synchronization of the parameter.

Furthermore, for example, if the setting unit 14a receives, as an operation performed by the user, an operation for releasing the synchronization between the cards in which the parameters are synchronized, the setting unit 14a releases the synchronization of the parameter. In the following, a process for releasing the synchronization of the parameters will be described with reference to FIG. 4. FIG. 4 is a diagram illustrating a process for releasing the synchronization of the parameters.

As illustrated as an example in FIG. 4, for example, if the setting unit 14a receives an operation for releasing the synchronization between the process 11 and the process 21, the setting unit 14a deletes the connection between the process 11 and the process 21. As a result, the process 21 becomes a parent card, and thus, it is possible to change the parameter in the state in which the parameter of the process 11 has been copied. The process 31 and the process 41 are synchronized with the setting of the process 21.

In this way, in the information processing device 10, if the synchronization function is released after the parameters have been synchronized, editing of the child card is possible in the synchronized state. As a result, it is possible to modify only some parameters after the parameters of the parent cards have been copied, which reduce time and efforts needed to set the parameter.

In addition, if the cards are the same kind of cards, the setting unit 14a may allow the parameters of the cards that are located at different phases in a series of processes to be synchronized. For example, the setting unit 14a may perform a setting for allowing the parameters of the processes that are the same kind and that are included in each of a series of processes for learning a model and a series of processes for performing determination by using the model learned by the processes to be synchronized.

Figure 5:
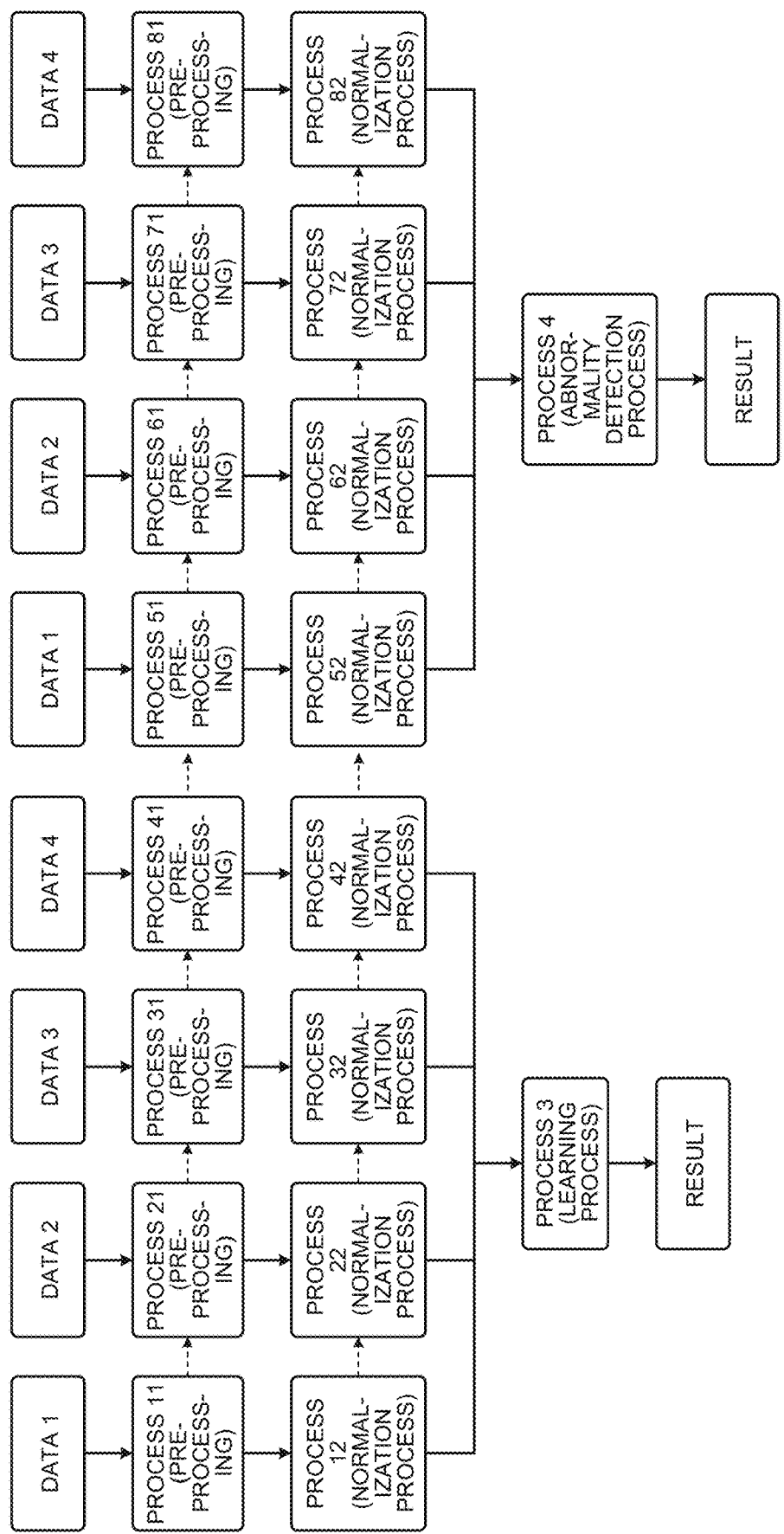
FIG. 5 is a diagram illustrating a setting for allowing parameters of the same kind of processes included in each of a series of processes for learning a model and a series of processes for performing abnormality detection by using the model learned by the process to be synchronized.

In the following, by using FIG. 5, a description will be made of the setting for allowing the parameters of the processes that are the same kind and that are included in each of the series of processes for learning a model and the series of processes for performing determination by using the model learned by the processes to be synchronized. As illustrated as an example in FIG. 5, the process 11 to the process 41, a process 12 to a process 42, and the process 3 are a series of processes that learn the model. In addition, a process 51 to a process 81, a process 52 to a process 82, and the process 4 are a series of processes for detecting abnormality by using the model.

The process 11 to the process 41 and the process 51 to the process 81 are the processes that are the same preprocesses and in each of which the same parameter is set, whereas the process 12 to the process 42 and the process 52 to the process 82 are the processes that are the same normalization processes and in each of which the same parameter is set. In other words, in the case where the parameters that have been set in the preprocesses and the normalization processes at the time at which a model is learned are desired to be set in also the preprocesses and the normalization processes at the time at which the model is used, in the information processing device 10, in addition to connecting the cards by using the synchronization lines that allow the parameters to be synchronized, it is possible to allow the parameters to be synchronized without setting the parameter into each of the cards, so that it is possible to reduce time and efforts needed to set the parameters.

If a parameter of one of the cards is changed out of the plurality of cards in which a setting for allowing the parameters to be synchronized has been performed by the setting unit 14a, the changing unit 14b performs the same change on the parameter of each of the processes that are associated with the plurality of cards connected by the synchronization lines.

If the process execution unit 14c receives an instruction to execute a process, the process execution unit 14c executes the received process. For example, the process execution unit 14c executes the process in accordance with the cards disposed on the screen. Furthermore, the process execution unit 14c executes the process by using the parameters that are set by the setting unit 14a or the parameters that are changed by the changing unit 14b. For example, the process execution unit 14c acquires, in a case of an example illustrated in FIG. 3, the "data 1" as the process target data from the data storage unit 15a, executes the processes in the order of the process 1, the process 2, and the process 3, and finally, outputs the result. In addition, the process execution unit 14c may be provided in an outside of the information processing device 10.

Processing Procedure Performed by Information Processing Device

Figure 6:
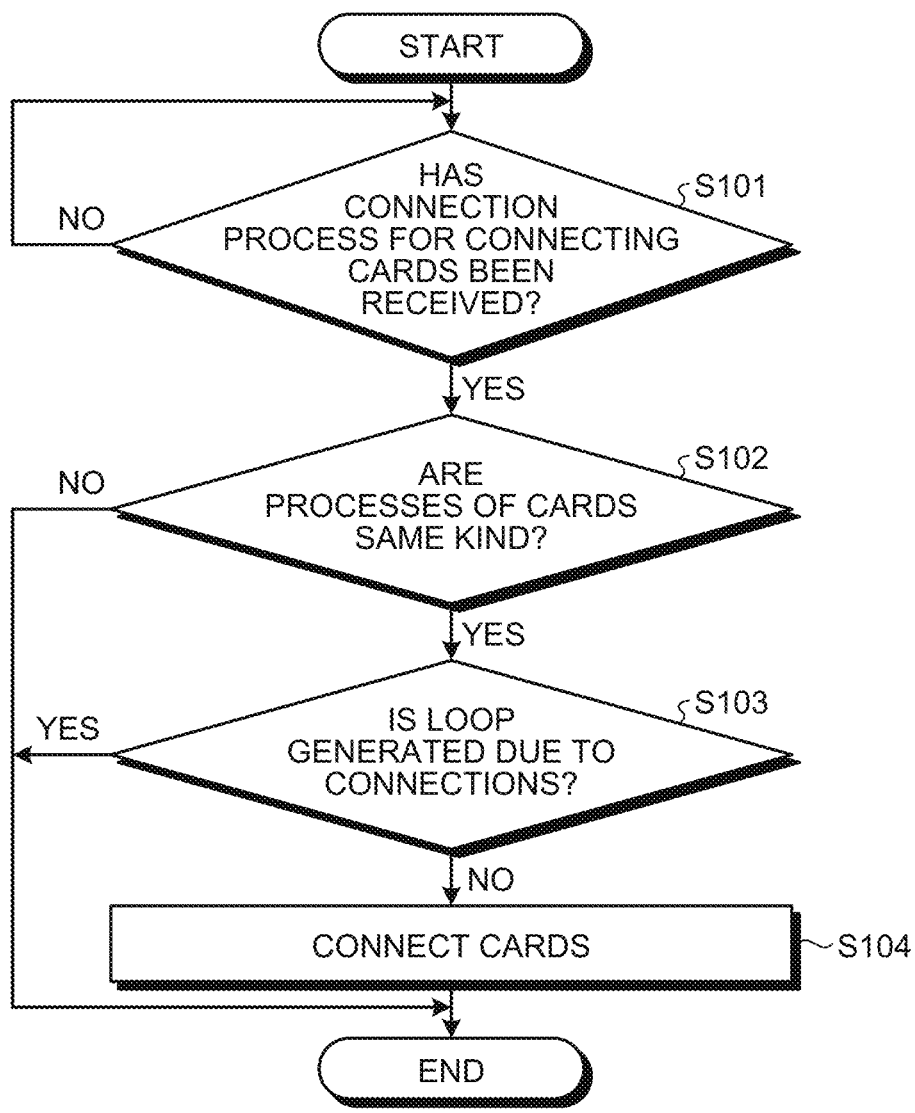
FIG. 6 is a flowchart illustrating an example of the flow of a card connection process performed in the information processing device according to the first embodiment.
Figure 7:
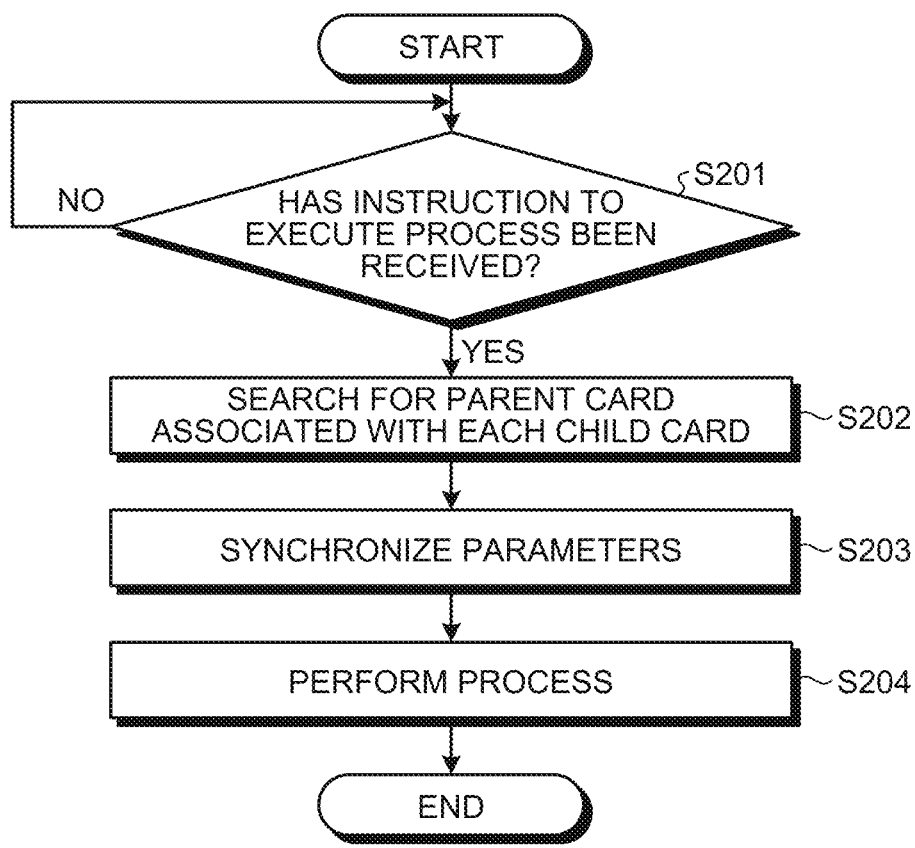
FIG. 7 is a flowchart illustrating an example of the flow of a parameter synchronization process performed in the information processing device according to the first embodiment.

In the following, an example of the processing procedure performed by the information processing device 10 according to the first embodiment will be described with reference to FIG. 6 and FIG. 7. FIG. 6 is a flowchart illustrating an example of the flow of the card connection process performed in the information processing device according to the first embodiment. FIG. 7 is a flowchart illustrating an example of the flow of the parameter synchronization process performed by the information processing device according to the first embodiment. In addition, a description below with reference to FIG. 7 will be made with the assumption that synchronization of the parameters of the connected cards is performed at the time at which the process is executed; however, the example is not limited to this and synchronization of the parameters may be performed at the time at which cards are connected or cards are opened.

As illustrated as an example in FIG. 6, when the setting unit 14a receives the connection process for connecting the cards (Yes at Step S101), the setting unit 14a determines whether the processes of the cards are the same kind (Step S102). Then, if the setting unit 14a determines that the processes of the cards are the same kind (Yes at Step S102), the setting unit 14a determines whether a loop is generated due to the connections (Step S103).

Then, if the setting unit 14a determines that a loop is not generated due to the connections (No at Step S103), the setting unit 14a connects the cards (Step S104). Furthermore, if the setting unit 14a determines that the processes of the cards are not the same kind (No at Step S102), or determines that a loop is generated due to the connections (Yes at Step S103), the setting unit 14a ends the process without connecting the cards. Furthermore, in addition to the determination performed at Steps S102 and S103 described above, for example, the setting unit 14a may determine whether the child cards are connected to the plurality of parent cards as a result of the connections. In other words, in the information processing device 10, the parent card is able to be connected to a plurality of child cards but a child card is not able to be connected to a plurality of parent cards. Accordingly, if the setting unit 14a determines that a child card is connected to a plurality of parent cards, the setting unit 14a may end the process without connecting the cards.

In addition, as illustrated as an example in FIG. 7, if the process execution unit 14c receives an instruction to execute a process (Yes at Step S201), the setting unit 14a searches for a parent card associated with each of the child cards (Step S202). Then, the setting unit 14a synchronizes the parameter of each of the child cards with the parameter of the parent card (Step S203). After that, the process execution unit 14c executes the process related to the received instruction (Step S204). In addition, in the example illustrated in FIG. 7 above, as a processing example of synchronization performed on the parameters of the connected cards, a case in which the child card searches for the parent card has been described; however, the example is not limited to this. For example, if the setting of the parent card has been changed, the parent card may search for a child card, and synchronization may be performed between the parameter of the searched child card and the parameter of the parent card.

Advantageous Effect of the First Embodiment

In the information processing device 10 according to the first embodiment, if an operation for connecting the cards using the synchronization lines that represent synchronization of the parameters is received, the information processing device 10 performs a setting for allowing the parameters of the respective processes that are associated with the plurality of cards connected by the synchronization lines to be synchronized, and makes, if the parameter of one of the cards is changed out of the plurality of cards in which the setting for allowing the parameters to be synchronized has been performed, the same change on the parameters of the respective processes associated with the plurality of cards that are connected by the synchronization lines. As a result, the information processing device 10 is able to reduce the time and efforts needed to set the parameters.

In other words, in the information processing device 10 according to the first embodiment, by allowing the parameter of the parent card to be recursively synchronized with the parameter of the child card using the synchronization line that represents the synchronization of the parameters, it is possible to reduce an input operation performed at the time at which the same parameter is allowed to be input to a plurality of items.

In addition, in the information processing device 10 according to the first embodiment, if the parameter of the parent card is determined depending on the data, by allowing the parameter of the parent card to be recursively synchronized with the parameter of the child card by using the synchronization line that represents the synchronization of the parameters, it is possible to check the parameter that has been determined depending on the data on the parent card and reduce an input operation performed at the time at which a plurality of items are input.

In addition, in the information processing device 10 according to the first embodiment, it is possible to easily implement a change in only some of parameters after the parameter of the parent card has been copied, so that it is possible to reduce the time and efforts needed to set the parameters.

System Configuration, Etc.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU or a GPU and by programs analyzed and executed by the CPU or the GPU, or implemented as hardware by wired logic.

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise stated.

Program

In addition, it is possible to generate a program in which a process to be executed by the information processing device described above in the embodiment is described in a computer executable language. For example, it is possible to generate a program in which the process performed by the information processing device 10 according to the embodiment is described in a computer executable language. In this case, it is possible to obtain the same effects as those described above in the embodiment by the computer executing the program. In addition, it may be possible to implement the same process as that described above in the embodiment by recording the program into a computer readable recording medium and allow the computer to read the program recorded in the recording medium.

Figure 8:
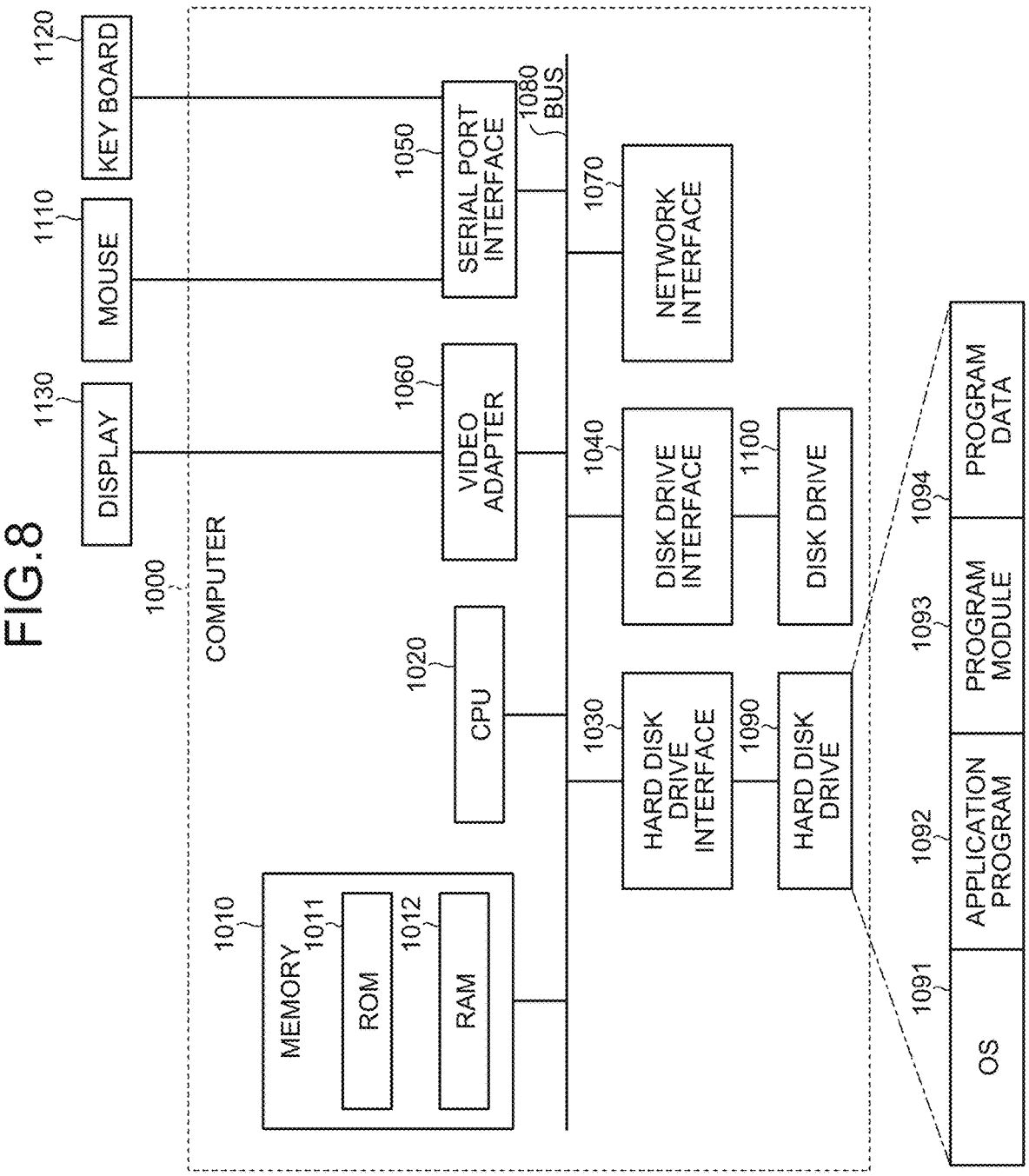
FIG. 8 is a diagram illustrating a computer that executes a setting program.

FIG. 8 is a diagram illustrating a computer that executes a setting program. As illustrated as an example in FIG. 8, a computer 1000 includes, for example, a memory 1010, a CPU 1020, a hard disk drive interface 1030, a disk drive interface 1040, a serial port interface 1050, a video adapter 1060, and a network interface 1070, and each of the units is connected by a bus 1080.

The memory 1010 includes, as illustrated as an example in FIG. 8, a read only memory (ROM) 1011 and a RAM 1012. The ROM 1011 stores therein, for example, a boot program, such as a basic input output system (BIOS). The hard disk drive interface 1030 is connected to a hard disk drive 1090, as illustrated as an example in FIG. 8. The disk drive interface 1040 is connected to a disk drive 1100, as illustrated as an example in FIG. 8. For example, a detachable storage medium, such as a magnetic disk or an optical disk, is inserted into the disk drive 1100. The serial port interface 1050 is connected to, as illustrated as an example in FIG. 8, for example, a mouse 1110 and a keyboard 1120. The video adapter 1060 is connected to, as illustrated as an example in FIG. 8, for example, a display 1130.

Here, as illustrated as an example in FIG. 8, the hard disk drive 1090 stores therein, for example, an OS 1091, an application program 1092, a program module 1093, and program data 1094. In other words, the above described program is stored, as a program module in which commands executed by the computer 1000 are described, in, for example, the hard disk drive 1090.

In addition, various kinds of data described above in the embodiment is stored in, as the program data, for example, the memory 1010 or the hard disk drive 1090. Then, the CPU 1020 reads the program module 1093 or the program data 1094 stored in the memory 1010 or the hard disk drive 1090 as needed into the RAM 1012 and executes various kinds of processing procedures.

In addition, the program module 1093 or the program data 1094 according to the program may be stored in, for example, a detachable storage medium as well as being stored in the hard disk drive 1090, and then may be read out by the CPU 1020 via the disk drive or the like. Alternatively, the program module 1093 or the program data 1094 according to the program may be stored in another computer that is connected via a network (a local area network (LAN), a wide area network (WAN), etc.), and then may be read out by the CPU 1020 via the network interface 1070.

According to the present invention, an advantage is provided in that it is possible to reduce time and efforts needed to set parameters.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device that displays, on a screen, cards associated with a series of respective processes performed on data and that defines a flow of the series of processes by connecting the cards by first lines, the information processing device comprising:
processing circuitry configured to:
receive an operation performed by a user;
perform, when an operation for connecting the cards by second lines that represent synchronization of values of parameters is received, a setting to allow the values of the parameters of the respective processes associated with the plurality of cards connected by the second lines to be synchronized; and
make, when a value of a parameter of one of the cards is changed out of the plurality of cards in which the setting for allowing the value of parameters to be synchronized has been performed, a same change on the values of the parameters of the respective processes associated with the plurality of cards connected by the second lines,
wherein the processing circuitry is further configured to, when the operation for connecting the cards by the second lines is received, determine that one of the cards is a parent card and the other of the cards is a child card whose parameter has a value that is changed in accordance with a change in the value of the parameter of the parent card, and perform a setting to allow the value of the parameter of the parent card to be synchronized with the value of the parameter of the child card,
the value of the parameter of the child card can only be set by setting the value of the parameter of the parent card, and
the value of the parameter of the parent card is determined depending on the data and is changed in accordance with a value of an average of the data or standard deviation out of the values of the parameters in a normalization process,
wherein the processing circuitry is further configured to perform a setting for allowing the values of the parameters of a same kind of processes that are included in each of a series of processes for learning a model and a series of processes for performing determination by using the model learned by the series of processes to be synchronized, and
in a case where the values of the parameters that have been set in a pre-process and the normalization process at a time which the model is learned are set in also the pre-process and the normalization process at a time at which the model is used, in addition to connecting the cards by using a synchronization line that allows the values of the parameters to be synchronized, allow the values of the parameters to be synchronized without setting the values of the parameter into each of the cards, wherein the processing circuitry is further configured to:
determine whether the child card is connected to multiple parent cards,
allow connection between the child card and the parent card when the child card is not connected to multiple parent cards, and
deny connection between the child card and the parent card when the child card is connected to multiple parent cards,
wherein only a part of the parameters is modified after the parameters of the multiple parent cards have been copied.

2. The information processing device according to claim 1, wherein the processing circuitry is further configured to, when the operation for connecting the cards by the second lines is received and when the processes indicated by the cards are a same kind of processes, perform the setting for allowing the values of the parameters to be synchronized.

3. The information processing device according to claim 1, wherein the processing circuitry is further configured to, when an operation for connecting the cards having parameters that are dependent on the data by the second lines is received, perform a setting for allowing values of the parameters that are dependent on the data to be synchronized.

4. The information processing device according to claim 1, wherein the processing circuitry is further configured to, when an operation for releasing synchronization between the cards whose parameters have values that are synchronized is received as the operation performed by the user, release the synchronization of the values of the parameters.

5. The information processing device according to claim 1, wherein the model is used to identify an abnormality in the series of processes performed on the data.

6. The information processing device according to claim 1, wherein synchronization of the value of the parameter between the parent card and the child card is performed at a time of execution of the parent card and the child card.

7. The information processing device according to claim 1, wherein the processing circuitry is further configured to
determine whether the operation for connecting the cards by the second lines creates a loop among the cards,
allow connection of the cards when connection of the cards does not create a loop, and
deny connection of the cards when connection of the cards creates a loop.

8. The information processing device according to claim 5, wherein the model is a neural network prediction model.

9. The information processing device according to claim 1, wherein, in a case that the child card has a further child card connected thereto, the processing circuitry is configured to synchronize the value of the parameter of the child card with a corresponding value of a corresponding parameter of the further child card.

10. A setting method performed by an information processing device that displays, on a screen, cards associated with a series of respective processes performed on data and that defines a flow of the series of processes by connecting the cards by first lines, the setting method comprising:
receiving an operation performed by a user;
performing, when an operation for connecting the cards by second lines that represent synchronization of values of parameters is received, a setting for allowing the values of the parameters of the respective processes associated with the plurality of cards connected by the second lines to be synchronized;
making, when a value of a parameter of one of the cards is changed out of the plurality of cards in which the setting for allowing the values of the parameters to be synchronized has been performed, a same change on the values of the parameters of the respective processes associated with the plurality of cards connected by the second lines, by processing circuitry; and
when the operation for connecting the cards by the second lines is received, determining that one of the cards is a parent card and the other of the cards is a child card whose parameter has a value that is changed in accordance with a change in the value of the parameter of the parent card, and performing a setting to allow the value of the parameter of the parent card to be synchronized with the value of the parameter of the child card,
wherein the value of the parameter of the child card can only be set by setting the value of the parameter of the parent card, and
the value of the parameter of the parent card is determined depending on the data and is changed in accordance with a value of an average of the data or standard deviation out of the values of the parameters in a normalization process,
wherein the setting method further includes performing a setting for allowing the values of the parameters of a same kind of processes that are included in each of a series of processes for learning a model and a series of processes for performing determination by using the model learned by the series of processes to be synchronized, and
in a case where the values of the parameters that have been set in a pre-process and the normalization process at a time at which the model is learned are set in also the pre-process and the normalization process at a time at which the model is used, in addition to connecting the cards by using a synchronization line that allows the values of the parameters to be synchronized, allowing the values of the parameters to be synchronized without setting the values of the parameter into each of the cards,
wherein the method further includes:
determining whether the child card is connected to multiple parent cards,
allowing connection between the child card and the parent card when the child card is not connected to multiple parent cards, and
denying connection between the child card and the parent card when the child card is connected to multiple parent cards,
wherein only a part of the parameters is modified after the parameters of the multiple parent cards have been copied.

11. A non-transitory computer-readable recording medium storing therein a setting program for displaying, on a screen, cards associated with a series of respective processes performed on data and defining a flow of the series of processes by connecting the cards by first lines, the setting program that causes a computer to execute a process comprising:
receiving an operation performed by a user;
performing, when an operation for connecting the cards by second lines that represent synchronization of values of parameters is received, a setting for allowing the values of the parameters of the respective processes associated with the plurality of cards connected by the second lines to be synchronized;

making, when a parameter of one of the cards is changed out of the plurality of cards in which the setting for allowing the values of the parameters to be synchronized has been performed, a same change on the values of the parameters of the respective processes associated with the plurality of cards connected by the second lines; and when the operation for connecting the cards by the second lines is received, determining that one of the cards is a parent card and the other of the cards is a child card whose parameter has a value that is changed in accordance with a change in the value of the parameter of the parent card, and performing a setting to allow the value of the parameter of the parent card to be synchronized with the value of the parameter of the child card, wherein the value of the parameter of the child card can only be set by setting the value of the parameter of the parent card, and the value of the parameter of the parent card is determined depending on the data and is changed in accordance with a value of an average of the data or standard deviation out of the value of the parameters in a normalization process, wherein the process further includes performing a setting for allowing the values of the parameters of a same kind of processes that are included in each of a series of processes for learning a model and a series of processes for performing determination by using the model learned by the series of processes to be synchronized, and in a case where the values of the parameters that have been set in a pre-process and the normalization process at a time at which the model is learned are set in also the pre-process and the normalization process at a time at which the model is used, in addition to connecting the cards by using a synchronization line that allows the values of the parameters to be synchronized, allowing the values of the parameters to be synchronized without setting the values of the parameter into each of the cards, wherein the process further includes:

determining whether the child card is connected to multiple parent cards, allowing connection between the child card and the parent card when the child card is not connected to multiple parent cards, and denying connection between the child card and the parent card when the child card is connected to multiple parent cards, wherein only a part of the parameters is modified after the parameters of the multiple parent cards have been copied.

* * * * *